(12) United States Patent
Antal et al.

(10) Patent No.: US 7,431,799 B2
(45) Date of Patent: Oct. 7, 2008

(54) EPICHLOROHYDRIN-BASED POLYMERS CONTAINING PRIMARY AMINO GROUPS USED AS ADDITIVES IN PAPERMAKING

(75) Inventors: Miroslav Antal, Pointe Claire (CA); Ivan I. Pikulik, Pointe Claire (CA); Xujun Hua, Kirkland (CA)

(73) Assignee: FPInnovations, Pointe-Claire, Quebec (CA)

( * ) Notice: Subject to any disclaimer, the term of this patent is extended or adjusted under 35 U.S.C. 154(b) by 521 days.

(21) Appl. No.: 11/062,819

(22) Filed: Feb. 23, 2005

(65) Prior Publication Data
US 2005/0192402 A1 Sep. 1, 2005

Related U.S. Application Data

(60) Provisional application No. 60/547,428, filed on Feb. 26, 2004.

(51) Int. Cl.
*D21H 17/52* (2006.01)
*D21H 17/56* (2006.01)
*C08G 59/10* (2006.01)
*D21H 21/10* (2006.01)

(52) U.S. Cl. .................. 162/164.3; 162/164.6; 524/800
(58) Field of Classification Search ............... 162/164.3, 162/164.6; 524/800
See application file for complete search history.

(56) References Cited

U.S. PATENT DOCUMENTS

| | | | |
|---|---|---|---|
| 2,926,116 A | | 2/1960 | Keim |
| 3,224,990 A | * | 12/1965 | Babcock ................ 524/845 |
| 3,493,502 A | * | 2/1970 | Coscia .................. 210/736 |
| 3,567,659 A | * | 3/1971 | Nagy .................... 528/405 |
| 3,899,389 A | * | 8/1975 | Vaughn et al. ........... 162/168.6 |
| 3,966,684 A | * | 6/1976 | Espy et al. .............. 528/367 |
| 4,054,542 A | * | 10/1977 | Buckman et al. ......... 528/405 |
| 4,310,645 A | | 1/1982 | Kempter et al. |
| 4,319,019 A | | 3/1982 | Lehmann et al. |
| 4,784,727 A | | 11/1988 | Schroer et al. |
| 5,128,100 A | * | 7/1992 | Hollis et al. ............ 422/14 |
| 5,246,548 A | | 9/1993 | Aston et al. |
| 5,993,604 A | * | 11/1999 | Finlayson et al. ........ 162/168.1 |
| 6,007,679 A | | 12/1999 | Nagarajan et al. |
| 6,455,661 B1 | | 9/2002 | Antal et al. |
| 6,468,396 B2 | | 10/2002 | Allen et al. |
| 2001/0014722 A1 | | 8/2001 | Akasaki et al. |
| 2002/0026992 A1 | | 3/2002 | Antal et al. |
| 2002/0056534 A1 | | 5/2002 | Thomas |

FOREIGN PATENT DOCUMENTS

| | | |
|---|---|---|
| CA | 1122615 | 4/1982 |
| CA | 1150262 | 7/1983 |
| CA | 1196454 | 11/1985 |
| CA | 2485113 | 12/2003 |
| EP | 0 359 956 | 8/1989 |

* cited by examiner

*Primary Examiner*—Steven P. Griffin
*Assistant Examiner*—Dennis Cordray
(74) *Attorney, Agent, or Firm*—Ogilvy Renault LLP

(57) ABSTRACT

Disclosed is a method for manufacture and application of a polymeric papermaking additive, which can be used in paper manufacture as an agent for improving retention, drainage, product strength and paper machine operation. The additive according to this disclosure is a polymer of epichlorohydrin and contains primary amino groups. Under neutral or acidic conditions these primary amino groups become cationic, which assures good adsorption of the polymer onto anionic fibers and fines of pulps used for production of paper or paperboard. By adsorbing on several fibers or fines, the polymer can increase the retention of fines and fillers. Primary amino groups of this polymer can also form chemical bonds with carbonyl groups of cellulose, lignin and hemicellulose, which are especially abundant in the fibers and fines of mechanical pulps. The cross-linking of fibers and fines by chemical bonds can increase the initial strength of wet web and the strength of rewetted paper. Mechanical pulps contain high negative charge and tend to deactivate many conventional cationic polymers. Because of its high cationic charge and the ability to form chemical bonds with mechanical pulp, novel papermaking additive according to this invention is particularly suitable for improving the retention and the strength of paper made from fibrous pulp suspensions that contain at least a portion of mechanical pulp. If the polymer has a high molecular weight it can be use as a single component retention and strength additive. If the polymer has a relatively low molecular weight, it can be conveniently used as coagulant and can be combined with a high-molecular-weight, low-charge-density polymer that serves as a flocculent.

6 Claims, No Drawings

EPICHLOROHYDRIN-BASED POLYMERS CONTAINING PRIMARY AMINO GROUPS USED AS ADDITIVES IN PAPERMAKING

This application claims benefit of U.S. Provisional Application No. 60/547,428, filed Feb. 26, 2004.

BACKGROUND OF THE INVENTION i) Field of the Invention

This invention relates to the production of paper and paper board and to a polymer additive for use in such production.

The invention also relates to processes for producing the polymer additive; a papermaking stock containing the polymer additive; a paper sheet derived from the papermaking stock containing the polymer additive; and a method of enhancing retention of components of a papermaking stock in a sheet formed from the stock.

ii) Description of the Prior Art

1) Sheet Formation and the Role of Retention Aids

During the fabrication of paper, a flat jet of a dilute fibrous suspension is injected onto the surface of a specially designed textile called a forming fabric, or into a converging gap formed by two forming fabrics. The bulk of the water is rapidly drained through one or two fabrics, while a large portion of the suspended solids, such as fibres, fines and filler, is retained by the fabric to form a sheet. Ideally, all the solid material dispersed between the fabrics should be retained in the sheet; however, a portion of the solids, especially very small particles and colloidal material escapes through the interstices of the forming fabrics. Retention is thus always less than perfect and for light grades of paper and tissue, it usually varies between about 20% and 80%. When the retention is low, a large amount of dispersed material is repeatedly circulated with whitewater before it is finally retained in the sheet. Some of the dispersed solids are not retained and, with the excessive whitewater proceed to the effluent treatment. Only a fraction of a second is usually available for water drainage on rapidly-operating, modern paper machines. Therefore, for good machine operation it is critical that the drainage occurs rapidly. However, during rapid drainage a high shear stress occurs in the forming zone, which tends to separate the particles of fillers and fines from the fibres, and thus impairing their retention.

The primary component of mechanical pulps is cellulosic fibres, but the pulps also contain about 30% of small wood debris usually referred to as fines. Furthermore, mineral pigments of small particle size are often used as fillers, in amounts ranging from a few percent to over 40% of sheet mass. These fillers are added to improve the printing quality of the paper, and to reduce its cost. The fines and fillers are too small to be retained on the forming fabrics by filtration. In the absence of chemical additives, a large proportion of these materials passes through the forming fabric and recirculates in the white water loop. Poor retention thus causes the loss of valuable papermaking material, impairs product quality and increases the cost of both production and waste water treatment.

A common papermaking practice includes the addition of polymeric materials (sometimes called retention aids) to the fibrous suspension in order to improve the retention of fines and fillers. The retention aids are capable of being adsorbed on to the surface of fines and fillers, causing the coagulation of fine particles into larger conglomerates and eventually, their adsorption onto the surface of pulp fibres. Polymeric additives described in the literature and available from various suppliers are used alone or with small molecular weight co-factors, sometimes also with one or two additional polymeric components, or with a mineral powder.

As with other natural fibres, pulp fibres are negatively charged. Many retention aids are positively charged polymers which are adsorbed onto the negatively charged fibres via electrostatic interactions. These polymers serve to improve the retention of fines and fillers during forming, and facilitate water drainage and some polymers are also used to improve product properties such as the strength of dry or rewetted product, or the rate of water or oil absorption.

Some water soluble polymers have a high density of cationic charge and are designed to reduce the negative charge of pulp components. One example of such polymers is poly (diallyl-dimethylammonium chloride), known as polydadmac [D. Horn and F. Linhart, in Paper Chemistry, Ch. 5 $2^{nd}$ Ed. by I. C. Roberts, Blackie Academic and Professional, London 1996.]. Other water-soluble polymers such as cationic starches [U.S. Pat. No. 2,768,162 (1956)] have only a low cationic charge, which improves their retention in the fibrous sheet, although the charge might not be sufficiently high to make these polymers act as good retention aids. Sizing agents, which are usually dispersed hydrophobic compounds designed to impede water absorption, are often applied as complexes or micelles with cationic materials, which cause their deposition on the negatively charge fibres [Can. Patent 1,247,810 (1989)]. The electrostatic absorption is also used for the retention of dyes and other papermaking additives.

2) Retention of Mechanical Pulps

Retention based on electrostatic interactions can be efficient for chemical pulps, which are composed of relatively pure cellulose, as most of the lignin and hemicellulose originally present in the wood is eliminated during pulping and bleaching and carry only a mild negative charge. Furthermore bleached chemical pulps are washed during their preparation and do not contain significant amount of dissolved and colloidal substances. By contrast, mechanical pulps contain almost all of the original wood mass, including almost all the hemicellulose and lignin and carry a much greater negative charge.

When wood is disintegrated by grinding or refining, as much as a few percent of it is dissolved and about 30% of the wood mass is converted to small fragments called "fines." It is well known that the fines carry larger negative charge than fibres. A large portion of dissolved components is hemicellulose, consisting of oligomers, which contain negatively charged carboxylic groups. Even higher negative charge is present in peroxide-bleached mechanical pulps, in which the alkaline peroxide treatment generates additional carboxylic groups especially by hydrolysing the ester groups in hemicellulose. High anionic charge is also found in mechanical pulps produced with a sulfite or bisulfite pre-treatment of the wood chips, as the sulphonation leads to the formation of sulphonic acid groups. Strongly negatively charged dissolved or finely dispersed materials react with the added cationic polymer and deplete it before it would have the opportunity to be absorbed onto the fibre. The resulting electrostatically neutral complex of cationic polymer and anionic pulp components might remain dissolved or dispersed in water rather than absorbed onto the fibres. Thus the high negative charge of mechanical pulps overwhelms the positive charges found on common retention aids, and greatly diminishes their efficiency.

A very large amount of cationic polymer would be required to neutralize all, or at least a substantial proportion of anionic charge in mechanical pulps. This would make the cost of polymer too expensive for a practical application. Therefore, alternative strategies have been developed for the retention aid used with mechanical pulps. Some retention aids are neutral and therefore hardly affected by the negatively charged dissolved or colloidal components. An example of such a retention system is polyethylene oxide, commonly referred to as PEO, which is usually used in combination with an enhancer that improves its absorption onto pulp [U.S. Pat. No. 5,824,192 (1998)]. Polyethylene oxide acts as a retention agent only if it has extremely high molecular weight. Typically the basis weight of PEO used for retention would be 3 to 8 millions Dalton. The preparation of polymers of such a high molecular weight is difficult and therefore the high molecular weight PEO is expensive. Another strategy is to use a large amount of inexpensive, highly-cationic material called "coagulant" to neutralize some of the "anionic trash," before adding more-expensive retention polymer having a high molecular weight and low cationic charge density, called "flocculent." In yet another strategy cationic polymer is used to flocculate the negatively charged pulp and agitation is applied to break these flocks into microflocks. Negatively charged pigment, referred to as "micro particles" is then used to cross-link these microflocks and to improve the retention [U.S. Pat. No. 6,007,679 (1999)].

3) Papermaking Additives Containing Primary Amino Groups

The cationic charge of many papermaking polymers is due to the presence of quaternary amino groups, which remain cationic at all values of solution pH, or tertiary amino groups which are cationic only in acidic solution, where the tertiary amino groups are protonated. There are only few papermaking additives that contain a significant proportion of primary amino groups.

Starches substituted with primary amino groups have been prepared using complicated procedures, which, if applied on a commercial scale, would make the products too expensive and therefore unsuitable for application as papermaking additives. Examples of such synthetic routes are described by F. Pancirolli and A. A. Houghton [UK patent 493,513 (1938)]. An alternative route for the production of starch additives containing primary amino groups was published recently [M. Antal, et. al., U.S. Pat. No. 6,455,661, (2002)]. The primary objective of this patent was to either eliminate the use of additive by modifying the pulp or to convert to papermaking additives inexpensive natural products such as starch. In particular, the objective was to prepare a starch derivative that could be used as additive with mechanical pulps, which deactivate most common cationic starches. Even after the modification these natural products have a relatively low charge density, 10 to 100 times lower than compounds that are described in this document. Therefore the primary amino starches are expected to be only moderately effective retention aids. Indeed such starch could potentially be used as a flocculant, in combination with a highly-charged, low molecular weigh polymer similar to those disclosed herein. To our knowledge no starch with primary amino group is commercially used as a papermaking additive.

Polyethylenimine is one polymer, which contains about ¼ of its amino groups in their primary form. Chitosan, derived from sea crustaceans is a primary amino group-containing carbohydrate that was used commercially as a papermaking additive [M. Laleg and I. I. Pikulik, Nordic Pulp and Paper Res. J., 7(4):174 (1992)]. The highly cationic natural polymer, chitosan, is a good retention additive when used with mechanical pulps and, compared with common cationic additives, resists better the deactivation by anionic charge of the pulp. Chitosan also increases the strength of freshly-formed wet webs, and of dried and then rewetted paper. These observations were rationalized by the presence of primary amino groups, which are capable of forming imino bonds with the carbonyl groups present at both ends of a glucose polymer and in lignin. Although chitosan derived from the shells of sea crustaceans found some application in papermaking, the material is too expensive for a wide-spread application. Different from chitosan most synthetic polymers derive their cationic charge from the presence of tertiary or quaternary ammonium groups. Tertiary amines or quaternary ammonium compounds can not form imino bonds with carbonyl groups [P. V. Sollenerger and R. B. Martin, Ch. 7 in The Chemistry of the Amino Group, Ed. by S. Patai, John Wiley and Sons, London (1968)]. Hemicelluloses modified chemically to contain amino groups, including primary amino groups were described in German literature [M. Antal, et. al., Das Papier, 51(5):223 (1997)].

Dendrimers were recently identified as effective flocculants for papermaking. Dendrimers are synthesized by adding to the central core several substituents, which are then chemically modified. In the subsequent reaction another series of substituents can be added onto each substituent added in the first reaction. The addition of substituents and their chemical modification can be repeated several times, each reaction sequence adding a new layer of substituents and forming a dendrimer of a "new generation." [G. R. Newkome, J. Polymer Sci., Part A, Polymer Chemistry, 31 (1993), p. 611-651.] While many dendrimers were reported in literature those tested as papermaking additives contained primary amino substituents [M. Polyerari, et. al., Tappi J. vol. 2, No. 9, September 2003, pp 3-8]. Two chemical reactions are required to enlarge a molecule of dendrimer by a new layer of substituents, which makes dendrimers expensive. Indeed those that were investigated for application as papermaking additive were formed by only one or two reaction sequences and therefore had low molecular weight [Polypropyleneimine, Brabander-van der Berg E. M. M. and Meijer E. W., Angew. Chem. Intl. Ed. Engl. 32-38]. These dendrimers contained some primary amino groups, but were found too expensive for an application in paper production. To our knowledge from polymers containing primary amino groups only chitosan has found some rare and sporadic application in the paper industry, as the cost of known synthetic polymers having primary amino is too high for papermaking applications.

SUMMARY OF THE INVENTION

It is an object of this invention to provide new polymer additives for use in papermaking.

It is a further object of the invention to provide processes for producing the polymer additives.

It is a still further object of the invention to provide a method of enhancing retention of components of a papermaking stock in a sheet formed from the stock.

A further object of the invention is to provide a method of producing a paper sheet from a papermaking stock which contains the polymer additive.

Another object of the invention is to provide a papermaking stock containing the polymer additive.

Yet another object of the invention is to provide a paper sheet derived from a papermaking stock containing the polymer additive.

In one aspect of the invention, there is provided a process for preparing a water-soluble papermaking polymer additive having a multitude of free amino groups effective to form cationically charged complexes with components of a pulp suspension comprising:

a) reacting epichlorohydrin and ammonia in equimolar amounts under a condition in which ammonia is in excess until the reaction is completed, or b) reacting epichlorohydrin and ammonia under a condition to produce tris(3-chloro-2-hydroxypropylamine) and reacting said amine at the chloro groups with a diamine of formula:

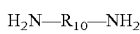

wherein $R_{10}$ is a straight or branched chain alkylene of 2 to 10 carbon atoms, or a polyamine of formula:

where $R_{11}$ is an aliphatic hydrocarbon radical of 5 to 15 carbon atoms, branched or straight chain, and m is an integer of 3 or 4, provided that the different amino groups are attached to different carbon atoms of the radical $R_{11}$, and reacting the resulting product with tris(3-chloro-2-hydroxypropylamine); or c) reacting a polyepichlorohydrin of formula:

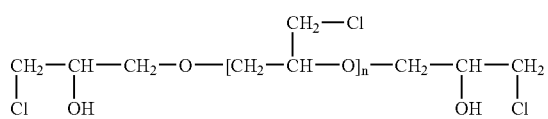

wherein n is an integer of 10 to 1,000, with a compound of formula:

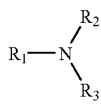

in which $R_1$, $R_2$ and $R_3$ are independently selected from hydrogen and straight chain or branched chain alkyl of 1 to 10 carbon atoms; or d) reacting a polyepichlorohydrin of formula:

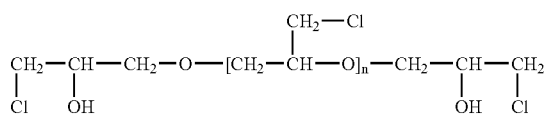

wherein n is an integer of 10 to 1000 with a polyamine; or e) reacting a polyepichlorohydrin of formula:

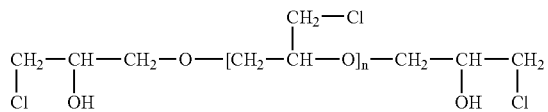

wherein n is an integer of 10 to 1000 with a polyol having a degree of polymerization of 2 to 400 to produce a polychlorinated polymer, and reacting the polychlorinated polymer at the chloro groups with a compound of

in which $R_1$, $R_2$ and $R_3$ are independently selected from hydrogen and straight chain or branched chain alkyl of 1 to 10 carbon atoms; or f) transforming a polyepichlorohydrin of formula

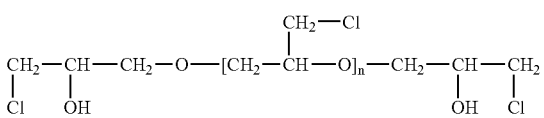

wherein n is an integer of 10 to 1000, in an alkaline medium, to a corresponding epoxypolyepichlorohydrin of formula

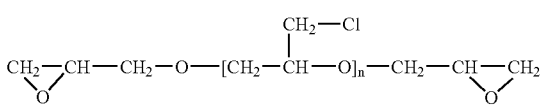

wherein n is as defined above, and reacting said epoxyepichlorohydrin with ammonia under conditions effective to convert the chlorine groups to amino groups.

In another aspect of the invention, there is provided a method of enhancing retention of components of a papermaking stock in a sheet formed from said stock in papermaking comprising incorporating in said stock a water soluble polymer of the invention.

In another aspect of the present invention, there is provided a water soluble polymer containing a multitude of amino groups obtainable by the processes described herein.

In yet another aspect of the invention, there is provided a method of producing a paper sheet comprising forming a sheet from a papermaking stock which contains a polymer of the invention.

In a further aspect of the invention, there is provided a papermaking stock comprising papermaking fibers and components in an aqueous vehicle, and a water soluble polymer of the invention.

In a still further aspect of the invention, there is provided a paper sheet derived from a papermaking stock of the invention.

DETAILED DESCRIPTION OF THE INVENTION

This invention thus relates to the production of paper sheets, for example paper or paper board and more specifically to the formation of fibrous web by draining water from aqueous suspensions of pulp and fillers in the forming section of a paper machine. In this process it is desirable to drain the water as fast as possible and to retain on the forming fabrics the largest possible proportion of pulp and filler. In the absence of retention additives a substantial portion of pulp fibres and various fine components of the production suspension are not retained on or between forming fabrics but pass through them and leave the former with so called whitewater. This invention concerns novel chemical additive that improves the retention of pulp components and fillers in the fibrous mat during its formation from a fibrous suspension and facilitate the drainage of water in the forming section of a paper machine. The additive according to this invention forms cationically charged complexes with some dissolved or colloidal components as well as with fines and fillers and these complexes are then deposited onto the surface of much larger, negatively charged fibres. During sheet forming, this process increases the retention of these small particles in the fibrous web. The polymer adsorbed on the surface of pulp can also crosslink the wet web by chemical bonds. With the removal of many dispersed and colloidal particles from the process water it is easier to drain water from the suspension, which increases the capacity of the forming section of paper machine.

The invention provides synthesized water soluble polymers containing primary amino groups which are simpler to prepare and less expensive than chitosan or dendrimers.

These polymers are prepared in synthesis reaction exploiting epichlorohydrin or a polyepichlorohydrin and ammonia or an amine.

The new polymers are cationic and their properties can be modified by modifying the polymerization conditions in which they are formed.

In this specification, 'paper sheet' refers to paper or paper board.

Papermaking stock refers to a suspension or dispersion of pulp fibers for use in making paper sheet and which typically comprises pulp fibers in an aqueous vehicle which also contains fibers and other components derived in the pulp production, as well as paper making additives, for example fillers, pigments, surfactants and opacifiers.

The polymer additives of the invention may have a highly branched starburst structure similar to that of dendrimers, or may have a highly branched structure in which the branching is random. The polymer additives may also be linear, and cross-linking may occur between branches of the polymer.

Suitably, the polymers will have a molecular weight (weight average) of 3,000 to $10^6$, preferably 5,000 to 100,000. The polymer additive is typically employed in an amount of 0.5 to 10 kg/ton, preferably 1 to 2 kg/ton, based on the dry weight of the papermaking stock without the polymer additive. Polymer additives of the invention and processes for their preparation are further described hereinafter, in different embodiments.

Embodiment 1

Highly Branched Polymer Containing Primary Amino Groups

A highly-branched polymer, with primary amino groups was obtained by a slow addition of equimolar amount of epichlorohydrin (ECH) to aqueous ammonia, at a temperature of 70-75° C. Under these conditions, ammonia reacts with epichlorohydrin first by displacing an atom of chlorine with an amino group and then by opening the oxirane ring to form 1,3-diamino-2-propanol (1).

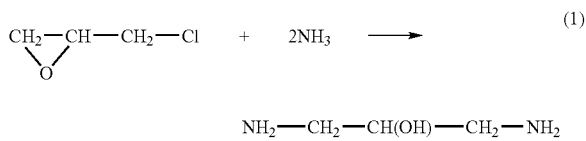

At elevated temperature used in this synthesis, the primary amino groups of (1) react with additional molecules of epichlorohydrin to form a branched structure (2-Cl), which contains four chlorine atoms in the form of α-halohydrins. These chlorine atoms react with additional ammonia to form the compound (2-N), which has four primary amino groups. Each of these four primary amino groups can again react with two molecules of epichlorohydrin to form a compound containing eight atoms of chlorine. Such branching of this molecule continues until all epichlorohydrin or ammonia is consumed and a highly branched polymer (3) containing a multitude of amino groups is formed.

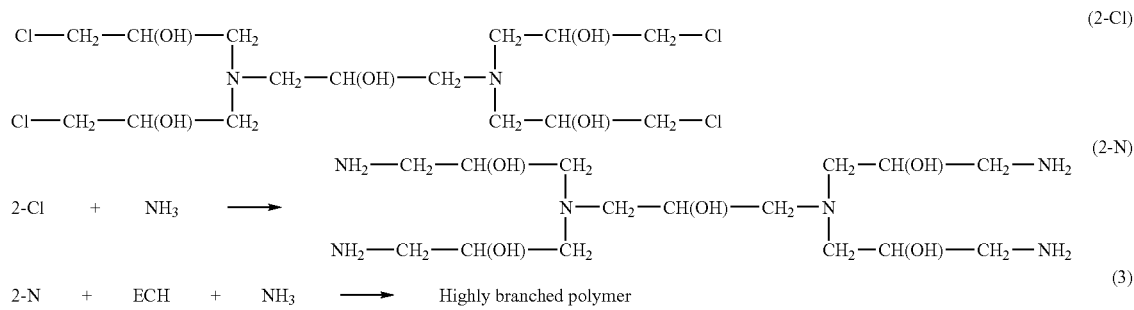

It was found that the rate of ECH addition affects the molecular weight of the product polymer. A high addition rate of ECH leads to a product with a low molecular weight. The product formed when ECH is added slowly into the agitated reaction mixture has high molecular weight and the solution becomes highly viscous. This high molecular weight product was found to have the best retention properties.

The highly-branched polymer obtained in this manner has the "starburst" structure similar to that of dendrimers, but it differs from dendrimers in the method of its preparation. To produce dendrimers two or several chemical reactions must be repeated a number of times, to build the branches step by step often using expensive reagents and catalysts. This makes their preparation very expensive. On the other hand the branched polymer disclosed here is prepared in a single step from inexpensive, mass-produced starting materials. This makes the product inexpensive and highly suitable for application as a papermaking additive.

Thus in a particular embodiment of the invention, there is provided a water-soluble starburst polymer containing a multitude of free primary amino groups formed by reaction between epichlorohydrin and ammonia, having a central star unit derived from the polyamine of formula:

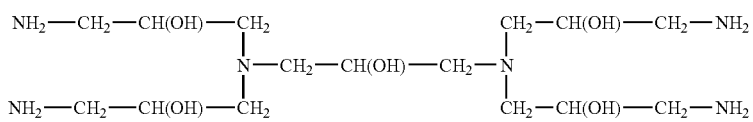

in which arms of said starburst polymer extend through successive reactions between the free amino groups of the starburst and epichlorohydrin with introduction of 2-hydroxy,3-chloro-propylene radicals and displacement of the chloro groups by ammonia with formation of 2-hydroxy,3-aminopropylamino, said polymer having a weight average molecular weight of 3,000 to $10^6$.

EXAMPLE 1

Synthesis of Highly Branched, Starbursts Polymer Containing Primary Amino Groups and Evaluation of its Effect on Retention 48.6 g of a 28% solution of ammonium hydroxide containing 0.8 mol of ammonia was diluted with 189.2 g of deionised water and heated to 75° C. During 1 h 73.6 g of epichlorohydrin (also 0.8 mol) were slowly added to the agitated solution. The reaction mixture was then heated for 2 h to 90-95° C. The yield was 92.1% of product with a pH value of 4.7 and a concentration of 28%. The material obtained in this manner had very high charge density, namely 4.39 meq/g at pH 4.

Laboratory tests demonstrated that this compound is a very effective coagulant; suitably cationic polyacrylamide is used as a flocculent. This dual retention system was found to be suitable even for a strongly anionic furnish containing peroxide bleached TMP. In the test a furnish from an Eastern Canadian mill was used, that was composed of 47% of peroxide-bleached TMP, 45% of unbleached TMP, and 8% of kraft pulp. The furnish contained about 20% of broke. The addition of 8 kg/t of branched polymer according to this embodiment and 0.3 kg/t of cationic polyacrylamide increased the dynamic drainage jar (DDJ) retention from 38.5% to 51.1%. The product was compared with the commercially available polyethylene imine, Polymin SKA (trademark from BASF), which increased the retention from 38.6% to 43.6% when applied in the same dosage and under identical conditions.

Embodiment 2

Cross-linked Highly Branched Polymer Containing Amino Groups

The reaction of excess epichlorohydrin with ammonia at a temperature below 20° C. was found to lead to the formation of tris(3-chloro-2-hydroxypropylamine) abbreviated as (TCH)Cl$_3$ (4). At this low temperature and with an excess of ECH, the reaction stops at compound (4). In the absence of ammonia, no further branching via compound (3) can occur.

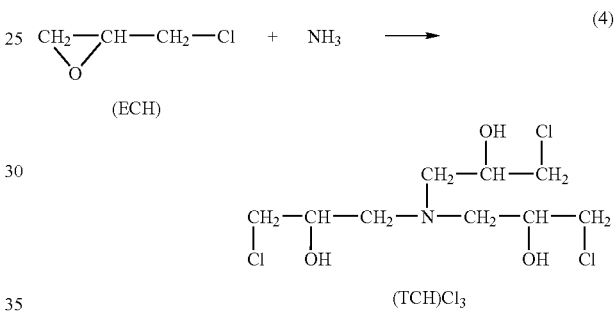

The reaction of (4) with ethylenediamine (EDA) leads first to an intermediate (5) in which the chlorine atoms are replaced by radicals derived from EDA. The amino groups of (5) can react with the chlorine atoms of additional molecules of compound (4) etc. The product is a highly branched cross-linked polymer of high molecular weight with a multitude of amino groups (6).

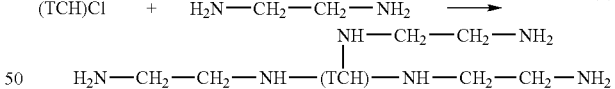

This polymer (6) again resembles dendrimers in that it is a highly branched polymer, but it differs in that it does not have a regular "starburst" structure, rather its extensive branching is formed randomly. More important is that its synthetic procedure has just two simple steps both using inexpensive materials and simple conditions and involves no separation steps. The product is therefore inexpensive and suitable for application as a papermaking additive. While EDA has been used in our example, other primary diamines or polyamines could be used to crosslink (TCH)Cl$_3$ to form high molecular weight, water soluble polyamines, suitable for application as papermaking additives.

Typically, diamines in this embodiment are of formula:

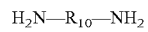

in which $R_{10}$ is a straight or branched chain alkylene of 2 to 10 carbon atoms. Preferably the amino groups are separated by 2 or more carbon atoms, i.e. preferably the amino groups are not attached to the same carbon atoms.

A typical polyamine which may be employed is of formula $R_{11}(NH_2)_m$ where $R_{11}$ is an aliphatic hydrocarbon radical of 5 to 15 carbon atoms, branched or straight chain, and m is an integer of 3 or 4, provided that the different amino groups are attached to different carbon atoms of the radical $R_{11}$, and preferably the amino groups are on non-adjacent carbon atoms, i.e. the amino groups are each separated by 2 or more carbon atoms of $R_{11}$.

Thus, in another particular embodiment of the invention, there is provided a water-soluble branched polymer containing a multitude of free amino groups having a central unit formed by successive reaction between epichlorohydrin, and ammonia, and then a polyamine, said central unit being of formula:

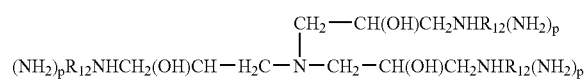

wherein: p is 1 and $R_{12}$ is an aliphatic hydrocarbon radical of 2 to 10 carbon atoms, straight or branched chain, or p is 2 or 3 and $R_{12}$ is an aliphatic hydrocarbon radical of 5 to 15 carbon atoms, straight or branched chain, and in which arms of said polymer extend through successive reactions between the free amino groups of the polymer and epichlorohydrin with introduction of 2-hydroxy,3-chloropropylene radicals and displacement of the chloro groups by an amino of an amine $R_{12}(NH_2)_p$ wherein $R_{12}$ and p are as defined above, said polymer having a weight average molecular weight of 3,000 to $10^6$.

EXAMPLE 2

Preparation of $TCHCl_3$ and the Compound (6) and Evaluation of its Effect on Retention A blend of 92 g (1 mol) of epichlorohydrin and 25.4 g of water was gently agitated at a temperature of 20 to 30° C. Water did not dissolve in epichlorohydrin and the two liquid phases were clearly visible. During a period of 60 to 90 min 41.6 g of a 28% solution of ammonia (0.33 mol of ammonia) was slowly added to an agitated mixture of the two liquids. The agitation continued until the two liquid phases merged, which occurred after about 2 hours. The product contained about 60% of compound (4).

In the second reaction step, 3.4 g of ethylenediamine was added to 83.3 g of the solution of (4), prepared as described above, which was heated to 90° C. The solution was gently agitated at this temperature for 2 hours. The polymer (6) prepared according to this procedure had a concentration of 61.6% and a charge density of 5.8 meq/g.

The retention properties of the polymer was tested using a dynamic drainage jar. 0.3 kg/t of polyacrylamide and 4 kg/t of highly branched cross-linked polymer (6) were added to a furnish composed of 95% peroxide-bleached TMP and 5% kraft pulp. This additive system increased retention from 38.2% to 52.2%. The product was compared with the commercially available polyethylene imine, Polymin SKA (trademark from BASF), which increased the retention from 38.5% to 47.5% when applied in the same dosage in a blend with a similar amount of identical polyacrylamide.

Embodiment 3

Linear Polymers Containing Primary Amino Groups

In acidic medium epichlorohydrin polymerizes to form polyepichlorohydrin $(PECH)Cl_3$ (7) according to the following reaction:

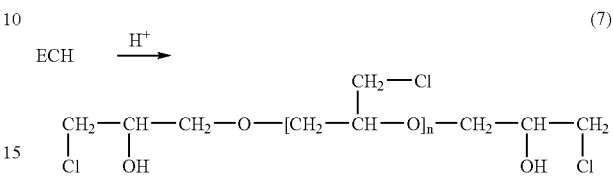

Depending on reaction conditions "n" might range from about 10 to 1,000, suitably 10 to 400. A high degree of polymerization is desirable for the preparation of an efficient papermaking additive. Compounds (7) are commercially available and are not a subject of this invention.

By reaction of polyepichlorohydrin (7) with excess of ammonia, or with a primary, secondary or tertiary amine, linear cationic polymers (8) containing primary, secondary, tertiary or quaternary amino groups were prepared. These linear polyamines bear a resemblance to polyvinyl amine or chitosan, but their preparation is simpler and less costly.

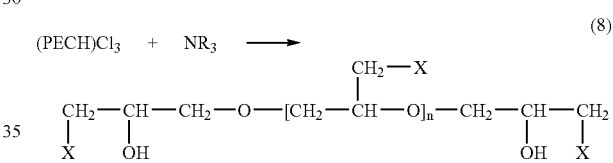

where each R is hydrogen or an alkyl radical of 1 to 10, preferably 1 to 6 carbon atoms, and straight chain or branched, and X is $NR_2$ or $N^+R_3$ and "n" is from 10 to 1000.

EXAMPLE 3

Synthesis of Linear Polymer Containing Primary Amino Groups and Evaluation of its Retention Efficiency 500 g of epichlorohydrin was added slowly, over about 150 min, to an agitated mixture composed of 10 g of concentrated phosphoric acid and 10 g deionised water maintained at a temperature between 90 and 95° C. Another equal dose of phosphoric acid (10 g) was then added and an additional 500 g of epichlorohydrin was dripped in over the next 2.5 h period. The product of this reaction was polyepichlorohydrin, the compound (7) shown above. This compound was used in a second reaction step without any separation or purification.

In the second reaction step, 500 g of polyepichlorohydrin, obtained as described above, was slowly added to 1000 g of a 28% solution of ammonia, and the mixture was gently agitated for 90 to 95 min to obtain the compound (8), in which X groups were $NH_2$.

The linear polyamine (8) with primary amino groups prepared in this manner had a charge density of 6.25 meq/g at pH 3. At the addition level of 4 kg/t this polymer increased the DDJ retention of unbleached TMP by 6.12%, namely from 69.42% to 75.54%. The polymer acted also as a binding agent. When sprayed on the dry handsheets made from TMP in an amount corresponding to 0.5%, their breaking length was increased by 8.7% and their Scott bond strength increased by 4.5%.

The same polymer was also used as a component of a dual retention system. The addition of 0.5 kg/t of linear polyamine described above and 0.3 kg/t of cationic polyacrylamide increased the DDJ retention of unbleached TMP from 75.80% to 85.43%.

Embodiment 4

Cross-linked Linear Polymers Containing Amino Groups

The functional properties of cationic, water-soluble polymers used as papermaking additives tend to increase with the increasing molecular weight. The polymerization of epichlorohydrin and subsequent reaction with ammonia or amines, described in example 3 above, can lead to polyamines with fairly high molecular weight. However, the molecular weight of (PECH)Cl$_3$ (compound 7) can be further increased if it is reacted with a small amount of ethylenediamine or other compound containing two or more amino groups. For example, cross-linking of polyepichlorohydrin (PECH)Cl$_3$ with ethylenediamine has significantly increased the molecular weight of this product and formed the polymer (9) in which m is an integer from 300 to 100,000. The cross-linking reaction is based on the high reactivity of α-halohydrines located at the ends of (PECH)Cl$_3$. However, the chlorine atoms of the side chain can also be substituted, which would lead to a three dimensional crosslinking of the compound (7). The amount of diamine used for crosslinking must be limited as excessive increase in molecular weight could limit the solubility of the product (9). One mol of EDA can react with two moles of α-halohydrine, but the molar ration of EDA to α-halohydrine can range between 1/5 and 1/1. While ethylenediamine has been used in this example, other diamines or polyamines could also be used, as described for process (2) above.

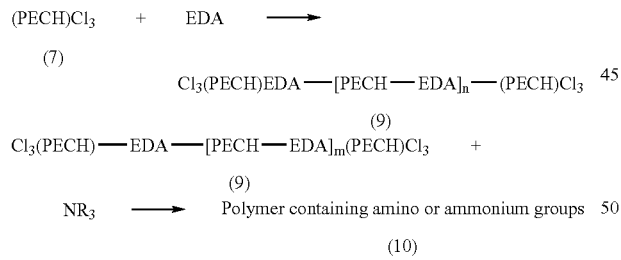

Branched cationic polymers (10), containing primary, secondary, tertiary or quaternary amino groups, can be prepared by reaction of polymer (9) with excess of ammonia, or with primary, secondary or tertiary amines. This last step resembles the second reaction described in the Example 3.

EXAMPLE 4

Retention Efficiency of Cross-Linked Polymer Containing Amino Groups

The polymer (9) was prepared by reacting PECH (7) with ethylene diamine. In particular, 2.28 g of EDA was gradually added to 20 g of agitated PECH (7) at 90° C.-95° C. and the temperature was maintained for 2 hours. The pH of the product (9) was 8.25. In the second reaction step, 20 g of 28% solution of ammonia was added to 10 g of product (9) and the mixture was agitated for 2 hours at 90° C.-95° C. to obtain the product (10) that contained largely primary, but also some secondary amino groups. This product had a charge density 6.49 meq/g at pH 3. At addition level of 4 kg/t of this polymer increased the DDJ retention of unbleached TMP by 11.65%, from 69.69% to 81.34%.

Embodiment 5

Polyamine Formed from Polyalcohol and Epichlorohydrin

The synthetic strategy used above for the preparation of PECH (7) can be used to attach, in acidic medium, polyepichlorohydrin to high molecular weight synthetic polymers containing hydroxyl groups, such as polyethylene glycol and polyvinyl alcohol. Polyethylene glycol is available in a range of the degree of polymerization, with n ranging from 2 to several hundreds. Polyethylene glycols with n of 10 to 1000 are suitable for this application. The reaction of a polyalcohol with epichlorohydrin or polyepichlorohydrin outlined below leads to a polychlorinated polymer (11) that contains reactive chlorine groups.

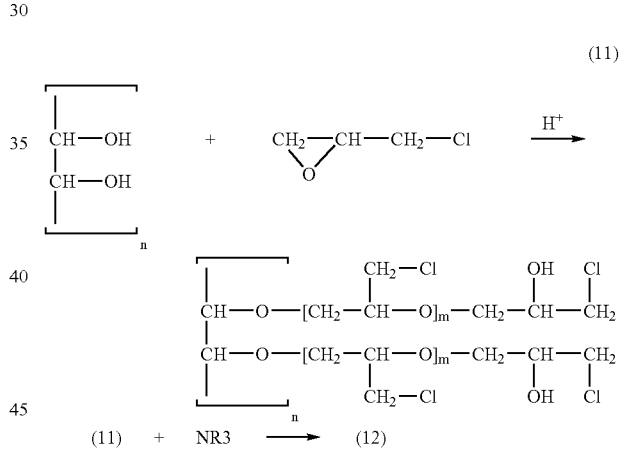

In a second step, these chlorine atoms can be substituted with ammonia, primary, secondary or tertiary amines to form a polyamine 12 containing primary, secondary, tertiary or quaternary amino groups, in a reaction that is analogous to the formation of the compounds (8) and (10). The product can be used in papermaking as a retention aid or a strength additive.

Embodiment 6

Polyamine Formed from Polyepichlorohydrin and Ammonia

Polyepichlorohydrin (7) obtained as described in Example 3 can be transformed to epoxypolyepichlorohydrin, the compound (13), in reaction with sodium hydroxide, a powder of sodium silicate or other strongly alkaline reagents, at temperature below 20° C.

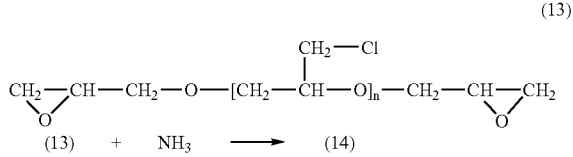

The epoxypolyepichlorohydrin (13) reacts with ammonia at low temperatures causing formation of cross-linked, highly branched polymer structures (14), in which a portion of chlorine atoms are replaced by imino bridges. The remaining chlorine atoms are replaced by primary amino groups, when the solution of the polymer reacted with an excess of ammonia, at increased temperature, namely in the range of 60-95° C. The product was a cationic, water soluble polymer that could be used as a retention aid in papermaking.

Unless otherwise indicated, or clear from the context, all "%" herein are by weight.

The invention claimed is:

1. A process for preparing a water-soluble papermaking polymer additive having a multitude of free primary amino groups effective to form cationically charged complexes with components of a pulp suspension and to form chemical bonds with the pulp comprising:

reacting epichlorohydrin and ammonia under a condition to produce tris(3-chloro-2-hydroxypropylamine) and reacting said tris(3-chloro-2-hydroxypropylamine) at the chloro groups with a diamine of formula:

$$H_2N-R_{10}-NH_2$$

wherein $R_{10}$ is a straight or branched chain alkylene of 2 to 10 carbon atoms, or a polyamine of formula:

$$R_{11}(NH_2)_m$$

where $R_{11}$ is an aliphatic hydrocarbon radical of 5 to 15 carbon atoms, branched or straight chain, and m is an integer of 3 or 4, provided that the different amino groups are attached to different carbon atoms of the radical $R_{11}$, and reacting the resulting product with tris (3-chloro-2-hydroxypropylamine).

2. A water-soluble papermaking polymer additive having a multitude of free primary amino groups obtainable or obtained by a process comprising:

reacting epichlorohydrin and ammonia under a condition to produce tris(3-chloro-2-hydroxypropylamine) and reacting said tris(3-chloro-2-hydroxypropylamine) at the chloro groups with a diamine of formula:

$$H_2N-R_{10}-NH_2$$

wherein $R_{10}$ is a straight or branched chain alkylene of 2 to 10 carbon atoms, or a polyamine of formula:

$$R_{11}(NH_2)_m$$

where $R_{11}$ is an aliphatic hydrocarbon radical of 5 to 15 carbon atoms, branched or straight chain, and m is an integer of 3 or 4, provided that the different amino groups are attached to different carbon atoms of the radical $R_{11}$, and reacting the resulting product with tris (3-chloro-2-hydroxypropylamine).

3. An additive according to claim 2 having a molecular weight of 3000 to $10^6$.

4. An additive according to claim 2 having a molecular weight of 5000 to 100,000.

5. A water-soluble branched polymer containing a multitude of free primary amino groups having a central unit formed by successive reaction between epichlorohydrin, and ammonia, and then a polyamine, said central unit being of formula:

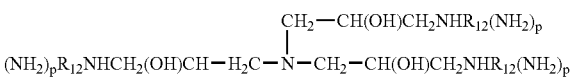

wherein: p is 1 and $R_{12}$ is an aliphatic hydrocarbon radical of 2 to 10 carbon atoms, straight or branched chain, or p is 2 or 3 and $R_{12}$ is an aliphatic hydrocarbon radical of 5 to 15 carbon atoms, straight or branched chain, and in which branches of said polymer extend through successive reactions between the free amino groups of the polymer and epichlorohydrin with introduction of 2-hydroxy,3-chloropropylene radicals and displacement of the chloro groups by an amino of amine $R_{12}(NH_2)_p$ wherein $R_{12}$ and p are as defined above, said polymer having a weight average molecular weight of 3,000 to $10^6$.

6. A polymer according to claim 5 wherein said molecular weight is 5000 to 100,000.

* * * * *